No. 838,318. PATENTED DEC. 11, 1906.
G. E. GRAHAM & J. F. MITCHELL.
CLUTCH CONSTRUCTION.
APPLICATION FILED JAN. 25, 1906.
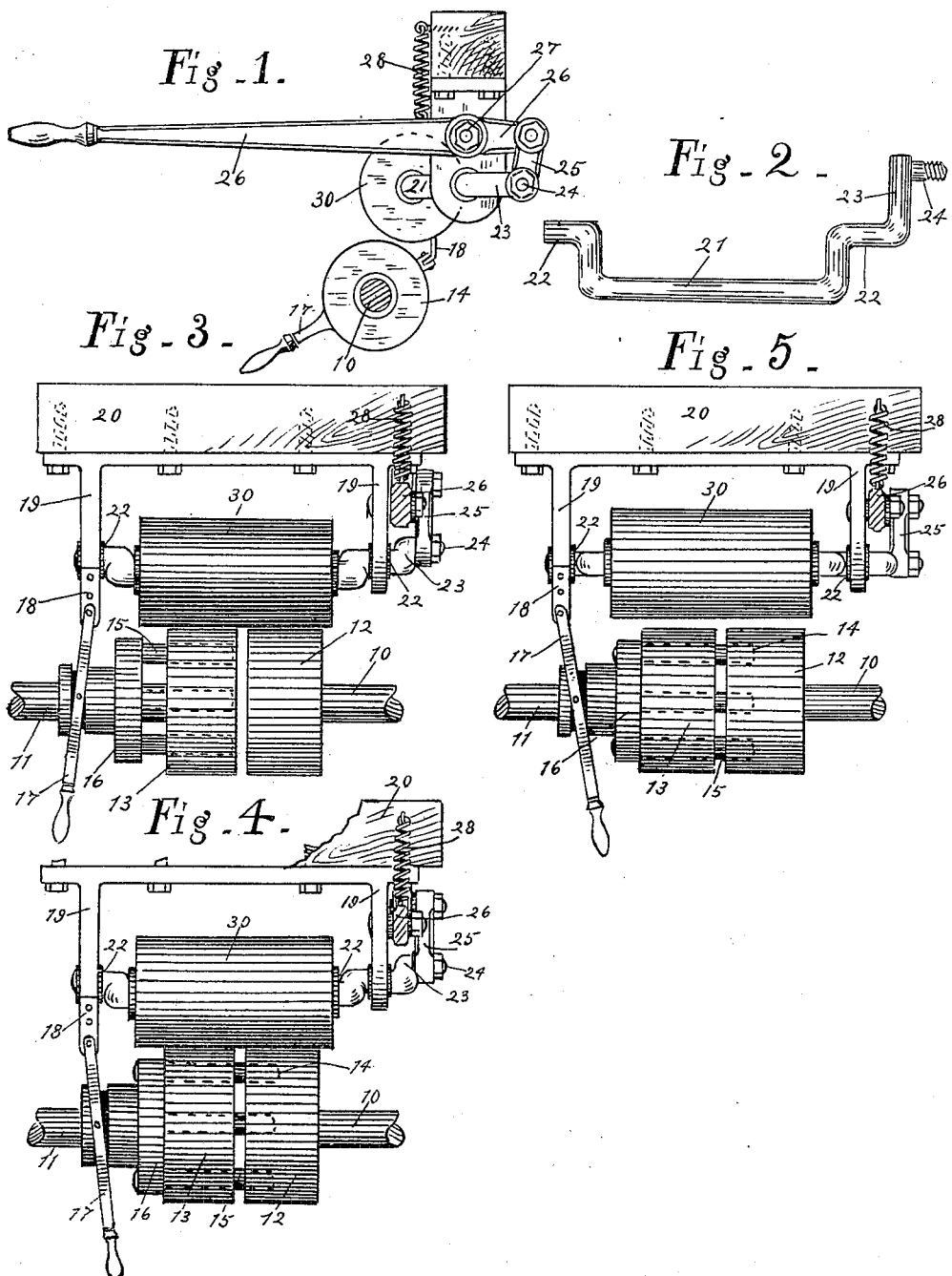
WITNESSES:
W. M. Gentle,
R. Allemong.
INVENTORS
George E. Graham.
John F. Mitchell.
BY V. H. Lockwood
ATTORNEY.

UNITED STATES PATENT OFFICE.

GEORGE E. GRAHAM AND JOHN F. MITCHELL, OF STEVENSON, ALABAMA.

CLUTCH CONSTRUCTION.

No. 838,318.        Specification of Letters Patent.        Patented Dec. 11, 1906.

Application filed January 25, 1906. Serial No. 297,784.

*To all whom it may concern:*

Be it known that we, GEORGE E. GRAHAM and JOHN F. MITCHELL, of Stevenson, county of Jackson, and State of Alabama, have invented a certain new and useful Clutch Construction; and we do hereby declare that the following is a full, clear, and exact description thereof, reference being had to the accompanying drawings, in which like numerals refer to like parts.

The object of this invention is to provide an improvement over the clutch construction set forth in Letters Patent No. 796,205, granted to us on August 1, 1905, whereby the driven member or shaft may be started slowly and its speed gradually increased until it equals that of the driving member.

The full nature of the invention will be understood from the accompanying drawings and the following description and claims.

In the drawings, Figure 1 is a side elevation of the device, the driven shaft being in section. Fig. 2 is the crank-shaft on which the starting-pulley is mounted. Fig. 3 is a front elevation of what is shown in Fig. 1 with the starting hand-lever in section and with the device in starting condition. Fig. 4 is the same after the operation of the clutch. Fig. 5 is the same after the starting-pulley has been removed from the clutch members.

In the drawings, 10 represents a driven shaft, and 11 a driving-shaft, to which is applied power from any suitable source. A driven pulley or member 12 is secured on the driven shaft 10, and beside it a driving member or pulley 13 is secured on the shaft 11. These two members 12 and 13 are mounted slightly apart, as shown. The driven member 12 has recesses 14 (shown by dotted lines) on its side next to the driving member to receive the ends of the pins 15, that are moved through the driving member 13, holes being provided in said driving member for their movement. The pins are on a movable head 16, that is splined on the shaft 11, and is moved by the hand-lever 17, that is fulcrumed to an arm 18 on the bracket 19, secured to a timber 20. In said bracket 19 there is mounted a crank-rod 21 substantially parallel with the shafts 10 and 11. It has two bearing portions 22, that have bearings in the brackets 19, and a crank portion 23, from which a threaded pin 24 extends, on which a ring 25 is pivoted, that is connected with a hand-lever 26, which may be called the "starting-lever." It is fulcrumed at 27 to one side of a bracket 19, and the spring 28 holds said lever 26 and the starting-pulley 30, which is mounted on the crank-rod 21, normally in an elevated position, so that the starting-pulley 30 will not be in engagement with the clutch members 12 and 13.

When the lever 26 is pulled downward, the starting-pulley is thereby moved downward into engagement with the clutch members, as seen in Fig. 3. This figure shows a starting position of the parts. It being understood that the driving-shaft 11 and member 13 are being rotated from some suitable source of power, power will be transmitted through the frictional engagement with the pulley 30 to the driven member 12. At first the lever 26 is drawn down slightly, so there will be considerable slippage between the pulley 30 and the clutch members 12 and 13; but as the driven member acquires speed the lever 26 is drawn down harder gradually until the two clutch members have substantially the same speed. Then the lever 17 is thrown to the right, as shown in Fig. 4, so that the clutch members are clutched together by the pins 15. Then the lever 26 is released, so the spring 28 will draw it and the pulley 30 upward out of operation, as shown in Fig. 5. This enables the driven member to be started as slowly and its speed increased as rapidly as desired, the operator having entire control over the starting, and the sudden starting of the driven member is thereby avoided.

What we claim as our invention, and desire to secure by Letters Patent, is—

1. The combination with driving and driven clutch members with their peripheries in alinement, and means for clutching them into engagement with each other, of an independent starting-pulley mounted beside and parallel with both clutch members, and means for moving said pulley into peripheral engagement with both clutch members for starting the driven member thereof slowly, substantially as set forth.

2. The combination with driving and driven clutch members and means for clutching them into engagement with each other, of a crank-rod mounted parallel with the axis of the clutch members, a starting-pulley on said crank-rod, means for actuating said crank-rod so as to move said starting-pulley into peripheral engagement with said clutch members, substantially as set forth.

In witness whereof we have hereunto affixed our signatures in the presence of the witnesses herein named.

GEORGE E. GRAHAM.
JOHN F. MITCHELL.

Witnesses:
W. B. BURCH,
G. M. JOHNSON.